United States Patent Office 3,463,002
Patented Aug. 26, 1969

3,463,002
WAVE AMPLITUDE MEASURING APPARATUS
Alfred Edward Bugg, London, England, assignor to Bruce G. White, Allan Harry Beckett, William E. Gelson, and John W. T. Tapp, all of London, England
Filed Aug. 1, 1967, Ser. No. 657,563
Claims priority, application Great Britain, Aug. 4, 1966, 34,984/66
Int. Cl. G01w 1/00
U.S. Cl. 73—170          10 Claims

ABSTRACT OF THE DISCLOSURE

The invention provides a wave amplitude measuring apparatus for measuring the amplitude of small surface waves in hydraulic models. The apparatus consists of an electrical circuit having a source of electrical power one terminal of which is connected to the liquid in the model, a light source connected to the power source and a probe which is arranged to oscillate into and out of contact with the liquid, thereby making and breaking a circuit to the light source. A rotating disc is provided to which the light source is attached and the wave form being analysed will become visible as an arc of light of varying length according to the wave amplitude in the model. A suitably calibrated scale is provided adjacent the light source so that the full scale wave amplitude can be read.

---

The present invention relates to an apparatus for analysing the wave form, i.e. for measuring the amplitude of a tangible wave travelling in a liquid, for example in hydraulic models which are used to aid the design and construction of breakwaters for ports and harbours. One of the difficulties experienced in this type of design work is to obtain an accurate assessment of the full scale effect that will be produced by the proposed structure. Models have been used in which the waves are simulated but accurate evaluation of wave forms has been found to be very difficult owing to the comparatively small amplitude of the simulated wave. If the scale is 500 to 1 then a 10 foot wave will be simulated by 1/50 of a foot or roughly ¼" on the model. It is important in harbour design to be able to measure a wave amplitude of a few inches represented in the model by a few thousandths of an inch and attempts to do this have been frustrated to some extent by surface tension which causes the liquid to cling to any measuring probe and produce a meniscus which interferes with the reading of any changes in level making it impossible to measure small changes.

It has been found that the meniscus effect can be greatly reduced by imparting a rapid axial oscillation to the probe used for measuring changes in level since the inertia of the water largely counteracts any drag due to skin tension in the liquid.

According to the present invention there is provided wave form analysing apparatus for use in analysing the wave form of a surface wave travelling in a liquid said apparatus including a probe, means for oscillating said probe into and out of contact with said liquid at an amplitude greater than that of the wave to be analysed and at a known frequency, means for determining when the condition of contact between the probe and the liquid changes and means for comparing the frequency of the contact and the probe frequency.

If the known frequency is different to, preferably greater than that of the wave form to be analysed the means for determining contact will probe a signal that can be analysed for example by a stroboscopic viewing device or cathode ray oscilloscope to give the amplitude and/or frequency of the wave form and the apparatus can include means for varying the known frequency of the probe. It will be obvious that the probe frequency selected will depend on a number of factors including the magnitude of the skin tension to be overcome and the wavelength of the wave form to be measured as is easily ascertainable empirically.

The apparatus may comprise an electrical power source having one terminal in contact with the liquid and the other terminal attached to the probe which may be spring loaded against a pivoted bar oscillated by a motor driven cam. The probe may be associated with a neon tube mounted on a disc driven by the cam motor or the electric impulses applied to the control circuit of a cathode ray tube so that a wave form trace is produced which is proportional to the wave form being analysed.

The invention will now be more particularly described with reference to the drawings in which.

Figure 2:
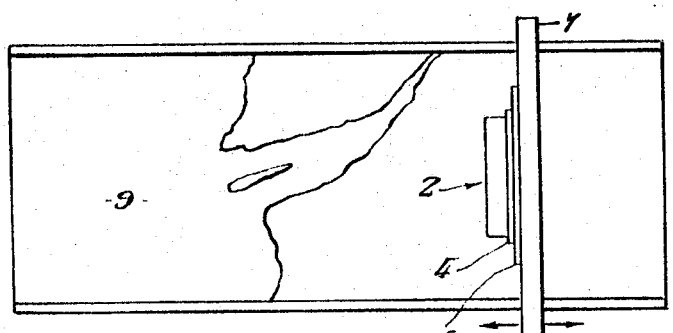

The wave amplitude measuring apparatus, indicated generally by reference 2 is secured in a frame 4 which is adjustably mounted for vertical movement in a main frame 6. A cross bar 7 (FIG. 2) spans an hydraulic model 9 and the main frame 6 is movably supported on the cross bar 7 which is itself movable relative to the model, so that the apparatus can be used to measure the wave amplitude at any position in the model.

The apparatus 2 comprises an electric motor 8 on whose drive shaft are secured a disc 10 and a cam 12. An arm 14 pivoted at one end about pivot pin 16 secured to the frame 4 contacts the cam 12 at a joint intermediate its length. A light rod or tappet 18 slidably mounted in a block 20 secured to the frame 4 engages at one end the arm 14 and at the other end a vertically slidable rod 22 terminating in a probe 23 of fine platinum wire, said rod 22 is spring loaded by a spring 24 housed in a block 26 in which the rod is slidably mounted. The block 26 is detachably attached to the block 20. The spring 24 urges the tappet 18 against the arm 14 and thereby the arm 14 is pressed against the cam 12.

The disc 10 is provided with a concentric slip ring 28 and a small neon tube 30 is mounted adjacent the periphery of the disc. The neon tube 30 is electrically connected by a lead, indicated by chain lines, to the slip ring 28 and via the body of the motor 8 to a battery 32 which has a lead 34, in contact with the water 36 in the model. The probe 23 is connected through a brush 38 to the slip ring 28 and completes the circuit to the neon tube by contacting the water 36. A scale member 40 in the form of an annulus is arranged around the disc 10. Additional blocks 20', 20" are provided giving three positions for mounting the block 26 carrying the probe 23. The choice of the positions determines the amplitude $h$ of the oscillation imparted to the probe 23.

In operation the electric motor 8 is started causing the arm 14 to pivot about pin 16 and the probe 22 to reciprocate at a frequency determined by the speed of the motor which in the example illustrated happened to be 1400 r.p.m. In the position chosen the probe 23 will oscillate at the greatest available amplitude $h$ which must in any event be greater than the maximum amplitude of waves to be measured. The frame 4 is adjusted relative to the main frame 6 so that the mid point of the amplitude of the probe 22 coincides with the level of the water 36 in the model when still. The neon tube 30 on the disc 10 will be visible as a semi-circular band of light 44 since the probe 23 is in contact with the water during half of its movement and out of contact with the water during the other half of its movement. In this position the changes in velocity of the probe will cause least effect on the accuracy of the measurement obtained and this can be provided for in the calibration of the scale. The wave making apparatus (not shown) is operated causing waves 42 (chain dotted line) to travel in the water 36 and the frequency at which the probe contacts the wave and the length of time during which the probe is in contact with the wave varies as each successive wave passes the probe. This variation is indicated by the neon tube circuit being made and broken and the semi-circular band of light 44 appears to increase and decrease in length (indicated by the dotted limit lines 46) as the probe contacts the crest and trough of the wave respectively. This increase and decrease in length of the band can be read off on the scale which is calibrated to give a direct reading to full scale amplitude of the wave simulated in the model. By moving the probe to various positions on the model the effect obtained by the positioning of breakwater elements can be quickly and accurately determined.

The apparatus provides an accurate method of measuring the depth of the waves because, as the probe 22 is reciprocating at a comparatively high frequency it leaves the water at a high velocity and owing to the inertia of the water an appreciable meniscus does not have time to form. It must be obvious that the presence of a substantial meniscus indicates that the probe was in contact with the water for a longer period than was really the case and in this way introduces serious errors.

Figure 3:
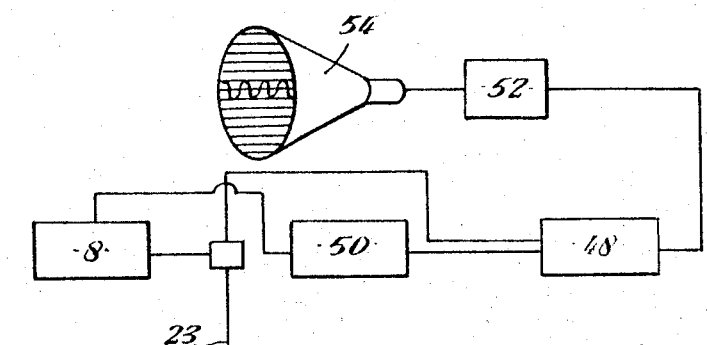
FIG. 3 is a block diagram of a modified form of apparatus according to the present invention.

Whilst in the above described example, the electrical impulses are used to illuminate the neon tube 30, the impulses can be fed to any suitable form of display apparatus, for example a cathode ray tube as shown in FIG. 3 so that a wave form trace is produced which is proportional to the wave form being analysed. In the apparatus shown in FIG. 3 the signals from the probe 23 and the motor 8 are fed to a comparator 48, the motor signal having been passed through an oscillator 50. The combined signal is fed to an amplifier 52 and then to a cathode ray tube 54 where the signal is displayed as a wave form proportional to the wave form being analysed.

Figure 1:
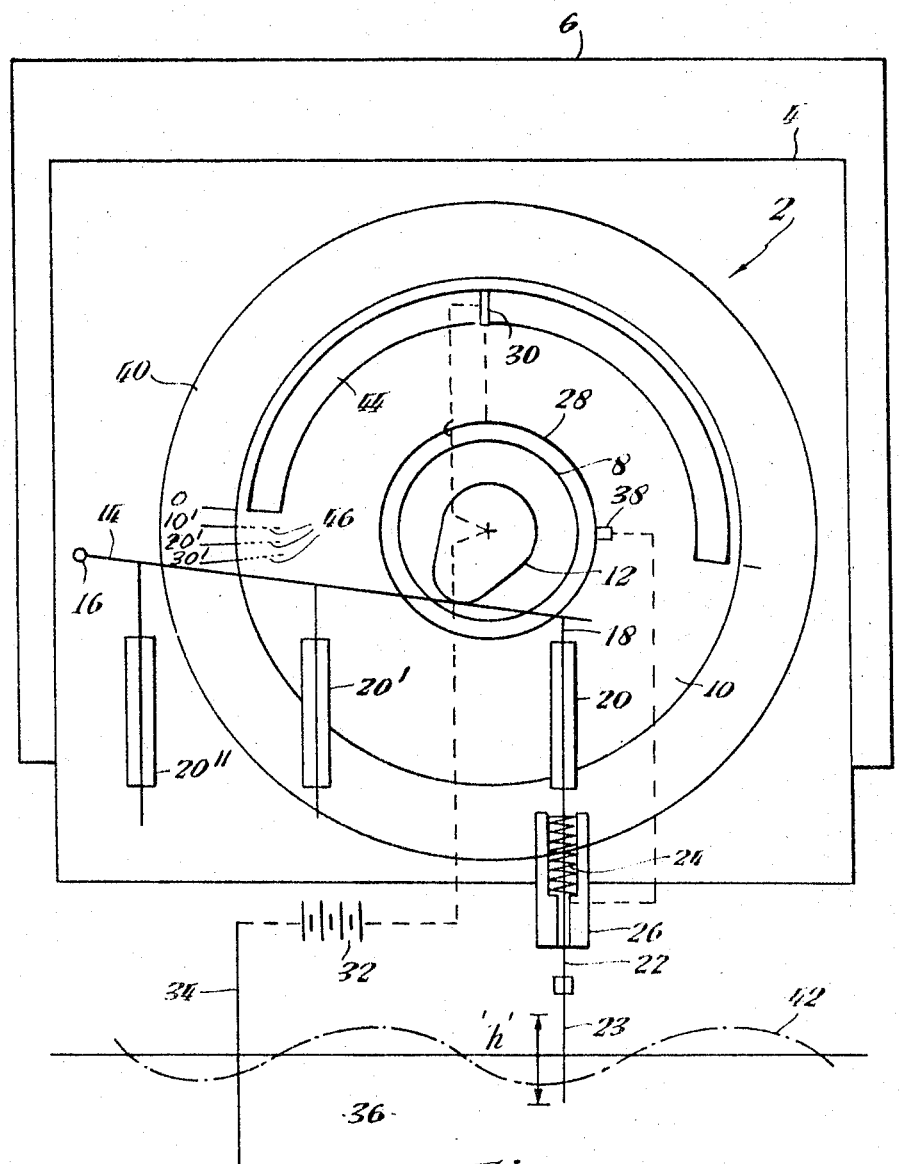
FIGS. 1 and 2 show respectively a diagrammatic elevation and plan of one form of wave amplitude measuring apparatus according to the present invention.
Figure 4:
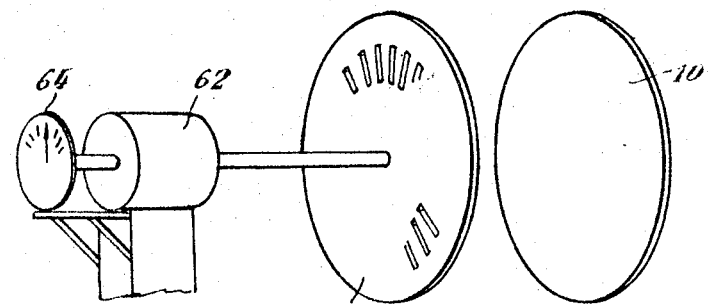
FIG. 4 is a diagrammatic perspective view of a modified form of the apparatus shown in FIG. 1.

For strobscopic analysis of the device shown in FIG. 1 a perforated disc 60 is used as shown diagrammatically in FIG. 4 which is positioned in front of the disc 10 and is driven by a variable speed motor 62 to which is coupled a revolution indicator 64.

In use the frequency of the probe is a known constant and the signals obtained will enable the amplitude of the wave form to be measured. If the frequency of the probe is varied until a non-varying signal is obtained then the frequency of the probe will be equal to that of the wave form or a multiple thereof. In this way a simple analysis of the wave form is obtainable both as to amplitude and/or frequency and even a complex wave form having superposed frequencies and amplitudes can be analysed.

What I claim and desire to secure by Letters Patent is:

1. Wave form analysing apparatus for use in analysing the wave form of a surface wave travelling in a liquid, said apparatus including a probe, means for oscillating said probe into and out of contact with said liquid at an amplitude greater than that of the wave to be analysed and at a known frequency, means for determining when the condition of contact between the probe and the liquid changes, means for comparing the frequency of the contact and the probe frequency, and means for reproducing the comparison in measurable form.

2. Wave form analysing apparatus according to claim 1 wherein the known frequency is different from the wave form to be analysed.

3. Wave form analysing apparatus according to claim 1 wherein means are provided for varying the known frequency.

4. Wave form analysing apparatus according to claim 1 wherein stroboscopic viewing means are provided for comparing the frequency of contact and the probe frequency.

5. Apparatus according to claim 1 wherein the means for determining when contact is made or broken includes an electrical power source, one terminal of which is connected to the liquid and the other terminal of which is connected to the probe and a sensing device in circuit with said power source responsive to a change of flow of current.

6. Apparatus according to claim 5 having a gas discharge light source connected in circuit between the probe and the power source.

7. Apparatus according to claim 6 in which the light source is rotatable at a speed which is direcely proportional to the probe frequency.

8. Apparatus according to claim 5 in which the means for oscillating the probe includes a pivoted arm in contact with a rotatable cam, the probe being spring loaded against the arm.

9. Apparatus according to claim 8 which includes a mounting movable relative to the pivot of said arm, said probe being axially slidable in said mounting for varying the amplitude of the probe.

10. Apparatus according to claim 1 which includes an electronic circuit having a cathode ray tube therein, and in which said probe is connected in the control circuit of the cathode ray tube.

References Cited

UNITED STATES PATENTS 3,225,593  12/1965  Richard.
3,301,048  1/1967  Felsenthal et al.

RICHARD C. QUEISSER, Primary Examiner

J. W. MYRACLE, Assistant Examiner

U.S. Cl. X.R.

73—148